United States Patent [19]

Ohmae et al.

[11] 4,037,144
[45] July 19, 1977

[54] CONTROL DEVICE FOR USE IN SHUNT MOTOR

[75] Inventors: Tsutomu Ohmae; Hideo Yano; Toshio Suzuki, all of Hitachi, Japan

[73] Assignee: Agency of Industrial Science & Technology, Tokyo, Japan

[21] Appl. No.: 562,983

[22] Filed: Mar. 28, 1975

[30] Foreign Application Priority Data

June 13, 1974   Japan ................................ 49-66525

[51] Int. Cl.[2] .......................................... H02P 5/16
[52] U.S. Cl. ..................................... 318/338; 318/405; 318/493
[58] Field of Search ........................ 318/405, 493, 338

[56] References Cited

U.S. PATENT DOCUMENTS

| | | | |
|---|---|---|---|
| 3,555,386 | 1/1971 | Wisman | 318/338 X |
| 3,803,468 | 4/1974 | Soeda | 318/338 X |
| 3,811,079 | 5/1974 | Tashiro et al. | 318/338 |
| 3,845,368 | 10/1974 | Eico | 318/338 X |
| 3,887,855 | 6/1975 | Klimo | 318/338 X |
| 3,950,684 | 4/1976 | Petersen | 318/405 |

Primary Examiner—B. Dobeck
Attorney, Agent, or Firm—Birch, Stewart, Kolasch & Birsh

[57] ABSTRACT

A system is disclosed for controlling the speed and torque of an electric motor throughout its entire operating range from low speed operation to high speed operation, while minimizing the total loss of energy in the motor. The minimization of energy loss is facilitated by controlling the motor field current during the low running speed of the motor as well as during the high running speed.

4 Claims, 10 Drawing Figures

CONTROL DEVICE FOR USE IN SHUNT MOTOR

BACKGROUND OF THE INVENTION

1. Field of the Invention

This invention relates to a control device for use in a shunt motor, and more particularly to a control device for a shunt motor which facilitates speed control in a wide range from low speed to high speed a well as torque control in said range, for the purpose of minimizing the total loss in an electric motor.

2. Description of the Prior Art

Heretofore, the speed and torque control of a shunt motor, in the low speed running mode, was carried out by maintaining the field current constant and varying the armature voltage and, in the high speed running mode, by maintaining the armature voltage constant and varying the field current. However, such an attempt still suffers from the failure to achieve the control throughout the entire running range with the minimization of the total loss of an electric motor. More particularly, it has been a common practice to weaken the field only in the high speed range, while in the low range, a field current is maintained strong side, and no consideration has been given to the loss. It follows from this that in the case of controlling a wide range of speeds or R.P.M., such as for instance, in the control device of a shunt motor for use in an electric motor vehicle, there results a failure to achieve a satisfactory efficiency in the control device, with the resulting loss in mileage of a vehicle.

SUMMARY OF THE INVENTION

It is accordingly an object of the present invention to provide a control device adapted for use in a shunt motor which will minimize the loss throughout the entire running range.

According to the present invention, there is provided a control device of the type described, which presents improved efficiency by carrying out the field-weakening control not only in the high speed running mode but also in the low speed running mode of a shunt motor.

DESCRIPTION OF THE PREFERRED EMBODIMENTS

Figure 1:
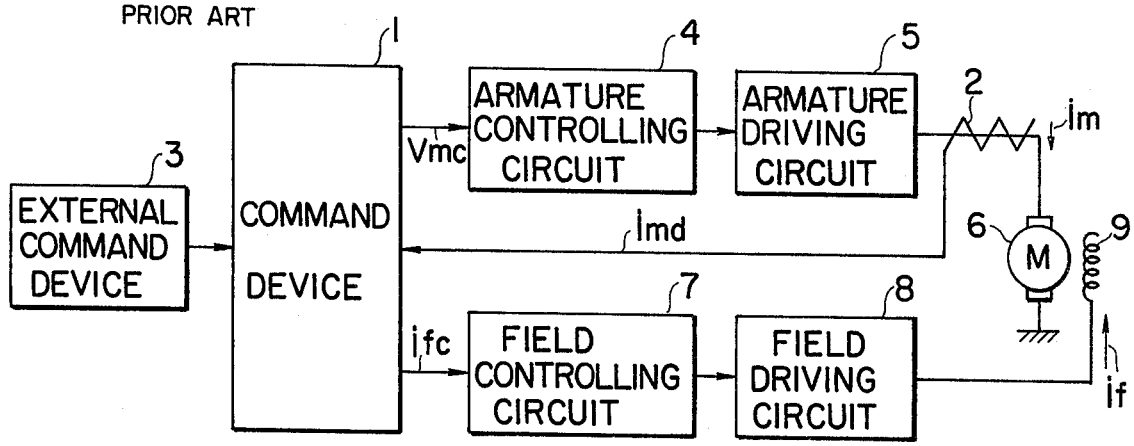
FIG. 1 is a block diagram showing a prior art shunt motor control device.

The overall arrangement of a Prior art shunt motor control device, in general, is shown in FIG. 1. A command device 1 receives a motor current $i_{md}$ detected in a current detector 2 and a command signal from an external command device 3, thereby developing an armature voltage command $V_{mc}$ and a field current command $i_{fc}$.

The armature voltage command $V_{mc}$ operates an armature controlling circuit 4 as well as an armature driving circuit 5 to thereby vary a motor voltage in a shunt motor 6. On the other hand, the field current command $i_{fc}$ serves to cause a field current $i_f$ to flow in a field winding 9 of the shunt motor 6 via a field controlling circuit 7 and field driving circuit 8. In this manner, a combined use of the armature voltage control and field current control permits the control of torque and speed of the shunt motor.

Figure 2:
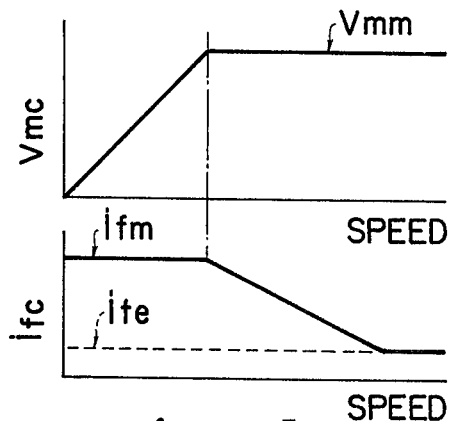
FIG. 2 is a plot illustrating the characteristics of the device of FIG. 1.

Generally, the relationship between the armature voltage command $V_{mc}$ and the field current command $i_{fc}$ is shown in FIG. 2. In other words, in a low speed running mode, the speed and torque are controlled by controlling the armature voltage $V_m$, while maintaining the field current $i_f$ constant. In case high speed running is required, the armature voltage $V_m$ is maintained constant, while decreasing the field current $i_f$ for the aforesaid purpose.

Meanwhile, in the case of a shunt motor control device as shown in FIG. 1, assume that the speed is constant, the total loss W (watt) of an electric motor including a driving circuit is expressed by the following approximate formula:

$$W = K_1 \cdot i_m^2 + K_2 \cdot i_f^2 + Wc \tag{1}$$

The first term represents the loss relating to the motor current $i_m$, including ohmic loss in an armature, armature driving circuit and the like. The second term represents the loss relating to the field current $i_f$, including an ohmic loss in the field winding as well as an ohmic loss in the field driving circuit. Wc in the third term represents a fixed loss such as a mechanical loss in an electric motor, which has no bearing on the current.

Assume that the field magnetic flux is developed in proportion to the field current $i_f$, then there may be established the following formula for the steady state:

$$\tau = K \cdot i_f i_m \tag{2}$$

, wherein $\tau$ represents a loading torque and K denotes a constant. A motor current $i_m$ for maintaining the loading torque constant and minimizing the total loss W satisfies the following formula (3):

$$K_1 \cdot i_m^2 = \frac{K_2 \cdot \tau^2}{K^2 \cdot i_m^2} \tag{3}$$

The following formula results when obtaining $i_m$ and $i_f$ from the formula (2) and (3);

$$i_m = \sqrt[4]{\frac{K_2 \cdot \tau^2}{K_1 \cdot K^2}} \tag{4}$$

-continued $$i_f = \sqrt[4]{\frac{K_1 \cdot \tau_i^2}{K_2 \cdot K^2}} \quad (5)$$

When erasing $\tau$ from the formula (4) and (5), the relationship between $i_m$ and $i_f$ which may minimize the total loss W may be expressed by the following formula:

$$i_f = \sqrt{\frac{K_1}{K_2}} \cdot i_m \quad (6)$$

By defining the relationship between the motor current $i_m$ and the field current $i_f$ as such given in the formula (6), there may be achieved running of a shunt motor which minimizes the total loss. It follows that the present invention controls $i_f$ and $i_m$ so as to satisfy the formula (6), thereby controlling the running of a shunt motor.

Figure 3:
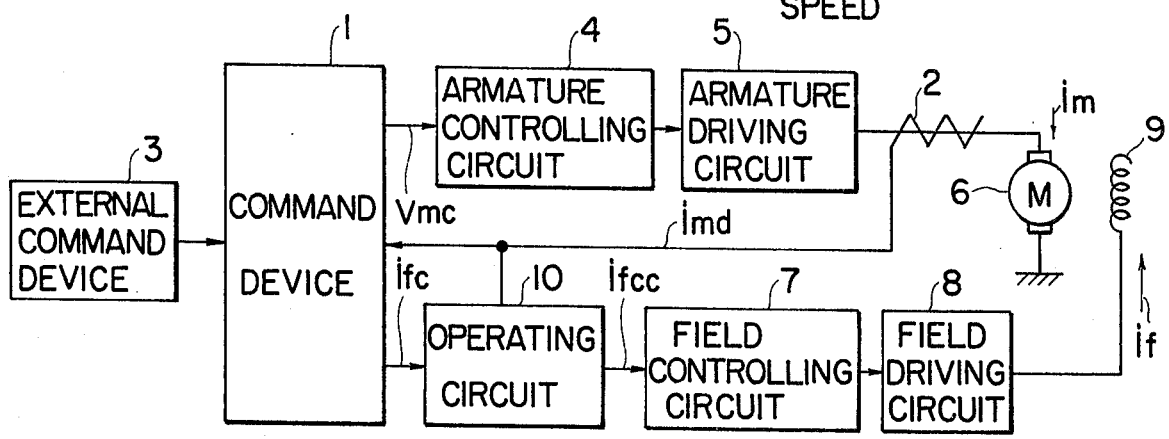
FIG. 3 is a block diagram showing one embodiment of the present invention.

FIG. 3 shows a block diagram of one embodiment of the present invention. In this respect, like reference numerals denote blocks having like function throughout FIGS. 1 and 3. The only difference between FIG. 1 and FIG. 3 is that there is provided an operating circuit 10 adapted to compensate for the field current command $i_{fc}$ in response to the motor current $i_m$. More specifically, in case an output $i_{md}$ of the motor current detector 2 is relatively low, there is used an operating circuit 10 which lessens the value of the field current command $i_{fc}$. Then, the output $i_{fcc}$ of the operating circuit 10 operates the field controlling circuit 7 and field driving circuit 8 to thereby control the field current $i_f$. In this manner, the speed may be controlled while satisfying the relationship between the motor current $i_m$ and the field current $i_f$ which may minimize the total loss W of the electric motor including the control device.

Description will now be given of the arrangement of the operating circuit 10 which is one of the features of the present invention.

Figure 4:
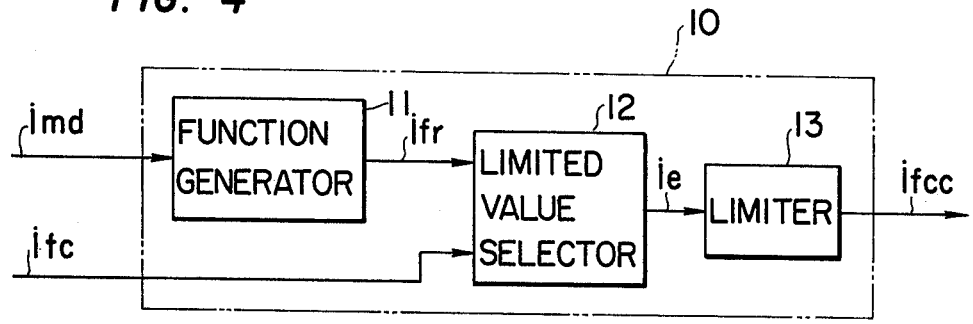
FIG. 4 is a block diagram showing an embodiment of an operating circuit shown in FIG. 3.
Figure 5:
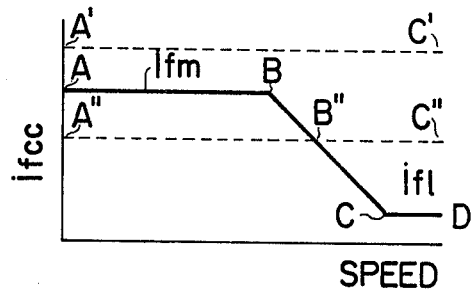
FIG. 5 is a plot showing the operational characteristics of the operating circuit of FIG. 4.

FIG. 4 shows one embodiment of the operating circuit according to the present invention and FIG. 5 shows the operational characteristics of the operating circuit of FIG. 4. The field current command $i_{fc}$ from the command device 1 in general is represented by a polygonal line as shown by ABCD in FIG. 5. In this respect, the line AB denotes the field current $i_{fm}$ which is maintained constant due to the magnetic flux of the magnetic coil which is saturated, even if the field current is increased more than the above value. The operating circuit 10 as shown in FIG. 4 consists of a function generator 11, limited value selector 12 and limiter 13. The output $i_{md}$ of the motor current detector 2 is fed to the function generator 11, and thus an output $i_{fr}$ is produced. The function generator 11 develops the field current command which minimizes the total loss W relative to the motor current $i_m$ and is approximately expressed by the line represented by the formula (6). On the other hand, if the detailed relationship is known, the field current command will be the function of the characteristic curve. The output $i_{fr}$ of the function generator 11 is compared with the field current command $i_{fc}$ in the limited value selector 12, and then a smaller value is selected to feed an output $i_e$. Then, the output $i_e$ is fed to the limiter 13 to thereby give a command signal $i_{fcc}$ for the field control circuit 7 (FIG. 3). The function of the limiter 13 is to limit the minimum value $i_{fcc}$ to $i_{fl}$ (FIG. 5), thereby preventing the field current $i_m$ from being zero.

With the circuit of such an arrangement, such as in the case where the motor current $i_m$ is large and the output $i_{fr}$ of the function generator 11 is such as shown by the line A'C' of FIG. 5, a signal of the function identical to the field current command $i_{fc}$ as shown by ABCD in FIG. 5 is developed as an actual field current command $i_{fcc}$. However, in case the motor current is small and the line A"B"C" in FIG. 5 represents the relationship between $i_m$ and $i_f$ which minimizes the total loss, a function represented by A"B"CD is developed for speed as an output of the limited value selector 12. In other words, in the range of A"B", $i_m$ and $i_f$ are determined for the sake of minimizing the total loss, while in the range of B"CD, the field current is weakened for increasing speed, so that a control for minimizing the loss may become possible for the running of a motor, which satisfies speed and torque required.

Figure 6:
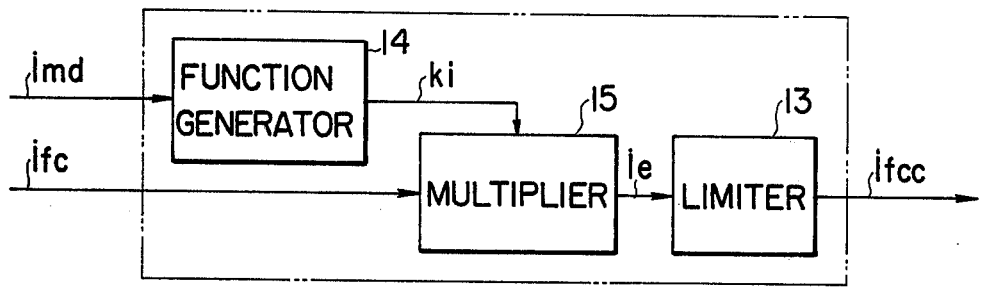
FIG. 6 is a block diagram showing another embodiment of the operating circuit of FIG. 3.

The operating circuit shown in FIG. 4 requires the limited value selector 12 which may feed the smaller one of two analog voltages $i_{fr}$, $i_{fc}$ all the time. However, the arrangement of the circuit is not simple. FIG. 6 shows the arrangement of another embodiment of the operating circuit 10 as shown in FIG. 3, which may be used for the above purpose.

Figure 7:
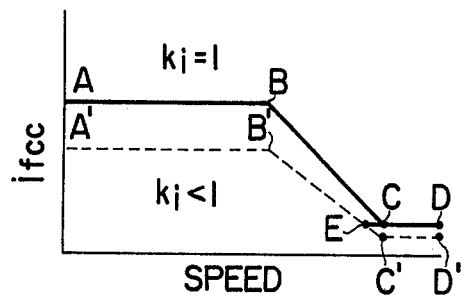
FIG. 7 is a plot illustrating the operational characteristics of the operating circuit of FIG. 6.

An output $i_{md}$ of the motor current detector is fed into the function generator 14 to thereby obtain an output $k_i$. In this respect, the function generator 14 develops an output which is proportional to $i_{md}$, when $i_{md} = i_{mo}$, while it develops an output $k_i = 1$, when $i_{md} > i_{mo}$. In this case, $i_{mo}$ is the value of $i_m$, in case $i_f = i_{fm}$ in the formula (6). In this manner, the output $k_i$ of the function generator 14 and the field current command $i_{fc}$ are multiplied in a multiplier 15, then $i_e$ thus obtained therefrom is fed to a limiter 13 to thereby obtain, as an output, a field current command $i_{fcc}$ for speed. In this manner, the field current command $i_{fcc}$ for speed will be such as shown in FIG. 7. Thus, the field current command $i_{fcc}$ will be as shown by ABCD identical to $i_{fc}$, when $k_i = 1$, while the field current command $i_{fcc}$ will be a command represented by A'B'CD, which substantially minimizes the total loss, when $k > 1$.

Figure 8:
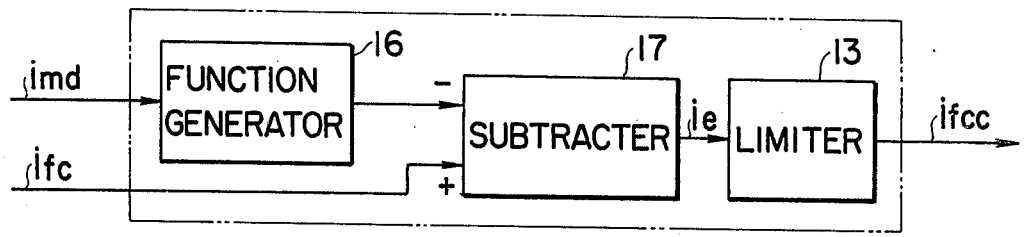
FIG. 8 is a block diagram showing another embodiment of the operating circuit of FIG. 3.
Figure 9:
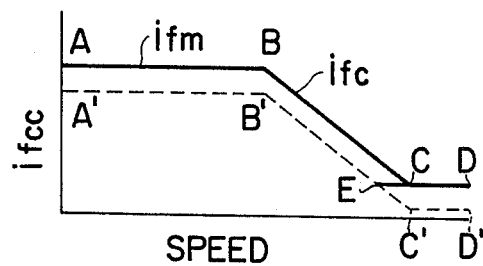
FIG. 9 is a plot showing the operational characteristics of the operating circuit of FIG. 8.

In addition, an operating circuit having a further simple arrangement as shown in FIG. 8 may be used as an embodiment. An output $i_{md}$ of the motor current detector is fed to the function generator 16 and then the output signal therefrom is subtracted from the field current command $i_{fc}$ in a subtractor 17. Then, the output from the subtracter 17 is fed in the limiter 13 to limit the lower limit, thereby developing the actual field current command $i_{fcc}$. With such an arrangement, in case the output $i_{md}$ of the motor current detector exceeds $i_{mo}$, then $i_{fcc}$ will be identical to $i_{fc}$. However, in case $i_{md}$ is less than $i_{mo}$, $i_{fc}$ will be reduced in proportion to $i_{md}$ for minimizing the total loss, with the resulting efficient achievement of control. In this case, however, as shown in FIG. 9, $i_{fcc}$ will present characteristics such as given by A'B'CD, which is obtained by subtracting a given value from $i_{fc}$.

Figure 10:
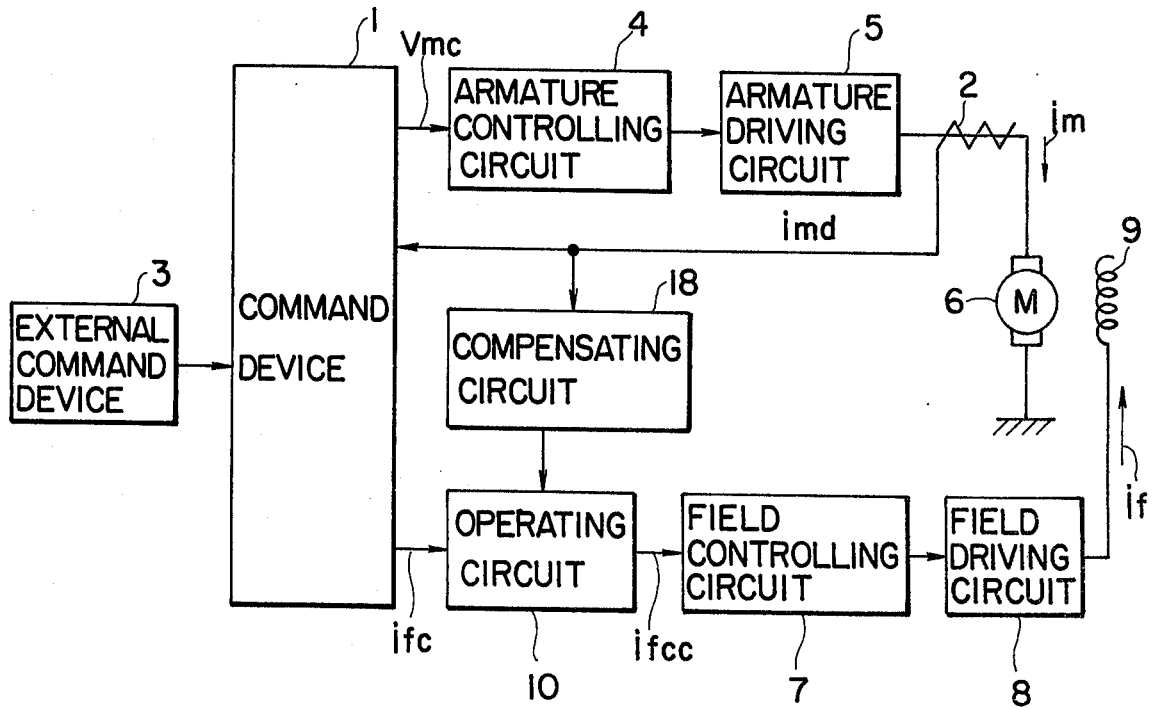
FIG. 10 is a block diagram showing another embodiment of the control device according to the present invention.

FIG. 10 shows a further embodiment of the present invention which presents an improved stability. The feature of the embodiment shown in FIG. 10 is that the output $i_{md}$ of the motor current detector is fed to a compensating circuit 18 and then fed as an input in the aforesaid operating circuit 10. In other words, it suffices that control to minimize the total loss by weakening the field current $i_f$, when the motor current $i_m$ is small, is carried out in the steady state. In this connection, the field command $i_{fc}$ from a command device 1 should respond rapidly for increasing speed. For these reasons, it is necessary for improving the stability of the control device in order that there be a difference in a response speed between a control loop which controls the field current command $i_{fc}$ from the command device 1 and the control loop which controls the field by means of the motor current, and that, because of the relationship to the characteristics in the steady state, the output $i_{md}$ of the motor current detector may be fed in the operating circuit 10 through the compensating circuit 18 consisting of a primary delay system having a considerable delay. With such an arrangement, the stability may be improved for the embodiment shown in FIG. 3.

As is apparent from the foregoing description of the control device according to the present invention, control for the field weakening control in a shunt motor is not only used for running an electric motor in the high speed range but also for minimizing the total loss of the control device including the electric motor, thus presenting greatly improved efficiency. This is particularly true with an electric motor vehicle using batteries as a power source, and the mileage of the vehicle may be increased to a great extent.

What is claimed is:

1. A speed control device for use in a shunt motor comprising:

means for generating an armature command signal pattern to control the speed of said shunt motor, the amplitude of said signal pattern increasing in response to the operating speed of said motor during a first range of operating speeds of said motor and being substantially constant during a second range of operating speeds of said motor;

means for generating a field current command signal pattern to control the speed of said shunt motor, the amplitude of said field current command signal pattern being substantially constant during said first range of operating speeds of said motor and decreasing in response to the operating speed of said motor during said second range of operating speeds of said motor;

means for controlling the armature voltage of said motor in response to said armature voltage command signal pattern;

means for controlling the field current of said motor in response to said field current command signal pattern;

means for detecting the armature current of said motor; and operating means for receiving the armature current detected and said field current command signal pattern and generating a field current control signal by varying the amplitude of said field current command signal pattern in response to said detected armature current.

2. A speed control device as set forth in claim 1 wherein said operating means includes limiter means for limiting the value to which said field current control signal is lowered during said second range of operating speeds.

3. A speed control device as set forth in claim 1 including compensating means for delaying the application of the detected armature current to said operating means with respect to the application of said field current command signal.

4. A speed control device as set forth in claim 1 wherein said operating means includes limited value selector means for limiting the maximum value of said field current control signal during said first range of operating speeds.

* * * * *